Aug. 14, 1962 L. V. GUEST 3,049,354

SOUND REPRODUCING APPARATUS

Filed July 19, 1957 4 Sheets-Sheet 1

INVENTOR
Lawrence V. Guest
BY
Ralph B. Stewart
ATTORNEY

INVENTOR
Lawrence V. Guest
BY
Ralph B. Stewart
ATTORNEY

Aug. 14, 1962 L. V. GUEST 3,049,354

SOUND REPRODUCING APPARATUS

Filed July 19, 1957

4 Sheets-Sheet 3

INVENTOR
Lawrence V. Guest
BY
Ralph B. Stewart
ATTORNEY

INVENTOR
Lawrence V. Guest
BY
Ralph B. Stewart
ATTORNEY

United States Patent Office 3,049,354
Patented Aug. 14, 1962

3,049,354
SOUND REPRODUCING APPARATUS

Lawrence Vincent Guest, Powke Lane, Old Hill, England, assignor to Birmingham Sound Reproducers Limited, Old Hill, England Filed July 19, 1957, Ser. No. 673,008
5 Claims. (Cl. 274—1)

The present invention relates to sound reproducing apparatus utilising disc records and in particular to sound reproducing apparatus of the kind which includes mechanism for executing a cycle of automatic operations upon completion of the reproduction of one record for the purpose of carrying out necessary movements such as repositioning of the pick-up and in some cases the feeding of a new record to the playing position in preparation for the next reproduction.

It is common in apparatus of this kind to make use of driving means for the automatic mechanism in the form of a first gear wheel capable of driven engagement with a second gear wheel on the turntable boss or otherwise continuously rotatable with the turntable, the first gear wheel having a gap in its teeth which during a reproduction lies opposite the second gear wheel so that the first gear wheel remains stationary, control means including parts carried by the first gear wheel and other parts mounted independently of the first gear wheel being provided which operates in response to entry of the stylus of the pick-up into the usual quick run-out groove of a played record to bring about a preliminary movement of the first gear wheel such as to cause the teeth of the two gear wheels to mesh, the first gear wheel being thereafter rotated through one revolution during which a cycle of automatic operations is executed and resuming its stationary position when the gap in the teeth of the first gear wheel again comes opposite the second gear wheel.

Control means for initiating the movement of the first gear wheel are known comprising a movable element urged continuously in one direction by the reproducer arm as the stylus traverses at least an end portion of the sound groove of the record and moves across the record surface at a normal speed and eccentric means driven by or with the second gear wheel and adapted to make intermittent contact with said element in such manner as to impart successive "cancelling" movements to said element in the other direction, the arrangement being such that when an accelerated movement is imparted to the pick-up arm through the entry of the stylus into the usual run-out groove of higher pitch provided at the end of the sound record groove an abutting engagement occurs between the movable element and the eccentric means to move said element in a manner effecting the preliminary movement of the first gear wheel to bring its teeth into driven mesh with the teeth of the second gear wheel.

The object of the present invention is to provide an improved and simplified form of control means of this kind.

In accordance with the present invention there is provided sound reproducing apparatus of the kind indicated above, having control means for initiating the drive of the first gear wheel by the second gear wheel comprising a pair of elements mounted for guided movements of limited extent on the first gear wheel and engaging or coupled with one another with friction, a first of said pair of elements being movable between two positions relative to the first gear wheel and in one direction in response to movement of the pick-up arm during reproduction and in the other direction by eccentric means rotating with the second gear wheel during rotation of the first gear wheel by the second gear wheel, and the second of said pair of elements having a contact part for intermittent engagement by eccentric means rotatable with the second gear wheel to move said second element intermittently relative to the first gear wheel in opposition to the frictional urge of the second element by the first element during reproduction of a record, and finally to move said second element in conjunction with the first gear wheel on entry of the stylus of the pick-up into the run-out groove of the record to effect driving engagement between the first and second gear wheels.

In one construction the first of said pair of elements is furnished with a part located near the end of the gear teeth of the first gear wheel which is trailing when that gear wheel is rotating, adapted to be moved by the pick-up arm during reproduction relative to the first gear wheel to a position in which it projects into the path of teeth of the second gear wheel when the first and second gear wheels are in driving connection and to be moved relative to the first gear wheel and out of said bath by engagement therewith of teeth of the second gear wheel when the first and second gear wheels are in driving connection.

The movement of the first element in the direction to bring the said part thereof towards and into the path of the teeth of the second gear wheel is a continuous movement during at least the period of tracking of the stylus in a number of the last turns of the sound groove and the movement of the second element on the first gear is in a succession of steps in alternately opposite direction, the step in one direction being effected by the frictional engagement with the first element and the intermediate steps in the other direction by engagement between a contact lug on the second element and an eccentric rotable in unison with the second gear wheel, whilst the first gear wheel is stationary.

The said first of said pair of elements may be shaped to provide a part capable in one position thereof on the first gear wheel of bridging at least one space between adjacent teeth of that gear wheel at the trailing end of the teeth at one side of the gap in the teeth and the contact part rotatable with the second gear wheel may be a tooth or teeth of the second gear wheel itself.

With an arrangement as described above, after the stylus has reached a position within a few turns of the end of the sound record groove the transmission commences to be moved by the pick-up arm to move the first element on the stationary first gear wheel continuously in one directional relative to that gear wheel, the rate of movement being constant whilst the stylus remains in the sound groove of normal pitch and during that movement a part of the said first element takes a position in which it will lie in the path of a contact part rotatable with the second gear wheel when the first gear wheel is subsequently rotated to execute a cycle of automatic operations, e.g. a part of the first element takes a position in which it bridges the space or spaces between adjacent teeth of the first gear wheel.

During this movement of the first element the second element is caused to move with it by virtue of the frictional engagement between the first and second elements, and as movement of the second element continues it is brought against the path of the eccentric means rotating with the second gear wheel and turntable.

Whilst the rate of movement of the first element is the constant rate referred to above the contact between the second element and the eccentric means rotating with the second gear wheel is a wiping or tapping contact and the second element is therefore set back with reference to the first element once for each revolution of the eccentric means against the friction between the first and second elements.

On entry of the stylus into the usual high pitch run-out groove at the end of the record the first element is moved by the transmission means with an accelerated movement of increased extent during the next revolution of the turntable and the second element is taken with the first element and to a position in which abutting engagement takes place between the second element and the eccentric means. A translational movement is thereby imparted to the second element involving movement of the first gear wheel sufficient to bring the teeth at one side of the gap in the first gear wheel into mesh with the teeth of the second gear wheel.

The first gear wheel is thereafter driven by the second to complete a single revolution during which a cycle of automatic operations is carried out and the first gear comes to a standstill when the gap in its teeth returns to the position opposite the second gear wheel.

Just prior to this position being reached the part of the first element lying in the path of the contact part rotatable with the second gear wheel e.g. the part of the first element bridging the space or spaces between teeth of the first gear wheel at the trailing end of the teeth at one side of the gap of that gear wheel is engaged by teeth of the second gear wheel and moved to reset the first element relative to the first gear wheel and therefore also the second element by reason of the engagement between the first and second elements, in readiness for the next operation of the automatic mechanism.

The invention is illustrated by way of example in the accompanying drawings in which FIG. 1 is a general view in perspective of one form of apparatus with which the present invention may be used;

Figure 9:
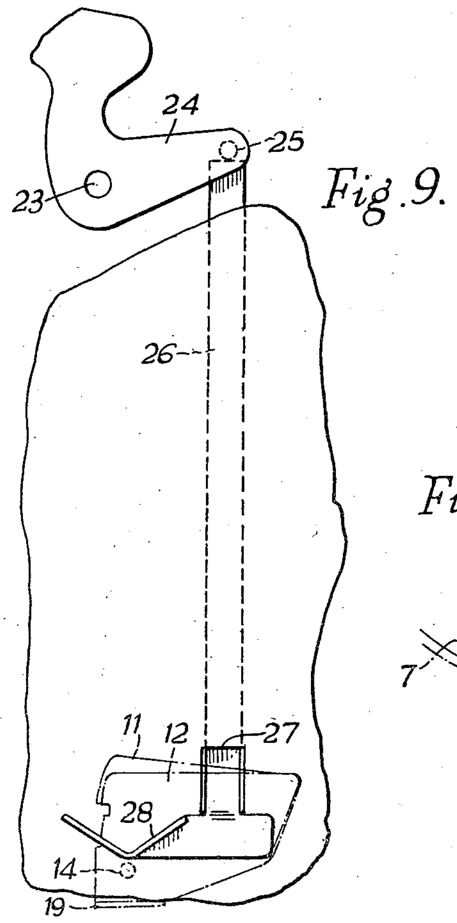
Figure 10:
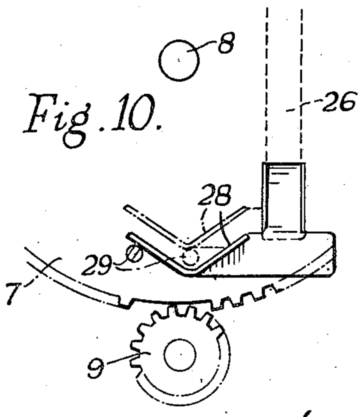

FIGS. 9 and 10 are views of the transmission menas between the pick-up arm and the movable elements mounted on the first gear wheel; and FIGS. 11 to 15 are plan views showing a succession of positions of the first gear wheel and the movable parts of the control means carried thereby, between a point just prior to commencement of an automatic cycle and a point just prior to completion of an automatic cycle.

Figure 1:
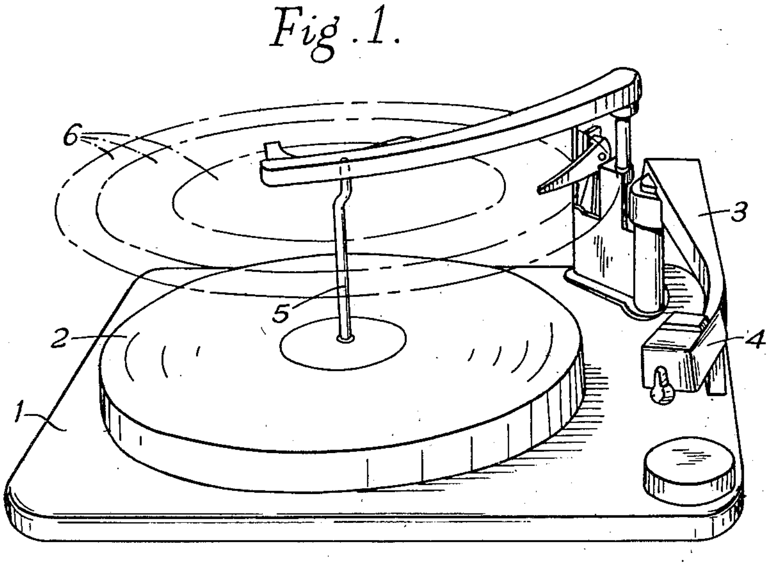

The machine shown in FIG. 1 comprises a motor board 1 supporting a motor (not shown) and a turntable 2 intended to be driven by the motor.

A pick-up arm 3 supporting a pick-up 4 is mounted above the motor board 1 in any convenient and well known manner for permitting the usual up and down and transverse swinging movements of the pick-up arm, and a fixed spindle 5 of known kind extends upwards from the centre of the turntable 2 to support a stack of records 6 above the turntable 2.

With machines of this kind, when the stylus of the pick-up 4 reaches the end of the sound record groove of a disc on the turntable, it enters the usual run-out groove in the disc and the consequent accelerated inward swinging movement of increased extent of the pick-up arm 3 is utilised to clutch an automatic mechanism with the driven rotating turntable 2 whereby a cycle of automatic operations is carried out including raising the pick-up arm to disengage the stylus of the pick-up from the played record, swinging the pick-up arm to an outer position, causing a further record to fall from the lower end of the stack 6 on the spindle 5 into the playing position, swinging the pick-up arm inwards and lowering it to engage the stylus with the new record.

The mechanism for carrying out the automatic operations may be of known kind and is not described or illustrated since it forms no part of the present invention.

It is known to drive such automatic mechanism by means of a toothed wheel such as is shown at 7 rotatable on a fixed post 8 on the motor board 1 and arranged to mesh with a toothed pinion 9 formed on the usual central boss on the underside of the turntable 2.

The first gear wheel 7 has a gap 10 in its teeth which lies opposite the pinion 9 when the gear wheel 7 is required to remain stationary i.e. during playing of a record, and arrangements are known in which a member carried upon the gear wheel 7 is caused, by the accelerated movement imparted to the pick-up arm 3 when the end of a record is reached, to be engaged by an eccentric member such as the projection 22 on the pinion 9, in such a manner as to move the gear wheel until its teeth mesh with the rotating pinion 9, the gear wheel 7 executing one revolution during which the cycle of automatic operations is executed, and coming to rest when the gap 10 returns to the position opposite the pinion 9.

The present invention resides in improved means whereby the first gear wheel 7 is caused to move into driven mesh with the second gear wheel or pinion 9 and moving parts reset at or near the end of one cycle of automatic operations in preparation for initiation of the next succeeding cycle of automatic operations.

In accordance with the invention two flat metal plates 11 and 12 are mounted in superposed relationship on a common pivot pin 13 on the first gear wheel 7 so that the adjacent surfaces of the two plates are frictionally engaged. The plates 11 and 12 constitutes the above-referred-to pair of frictionally engaged elements and the plates 11 nearest the gear wheel 7 and constituting the first element is provided on its underside with a pin 14 extending through and below a slot 15 in the gear wheel 7.

Figure 5:
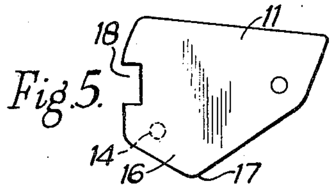
FIGS. 5 and 6 and FIGS. 7 and 8 are plan and elevational views showing separately, parts intended to be mounted on the first gear wheel.
Figure 6:
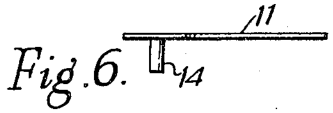
Figure 7:
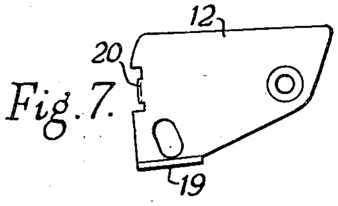
Figure 8:
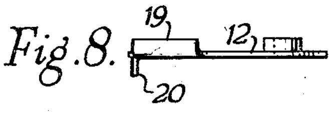
Figures 11, 12, 13, 14, 15:
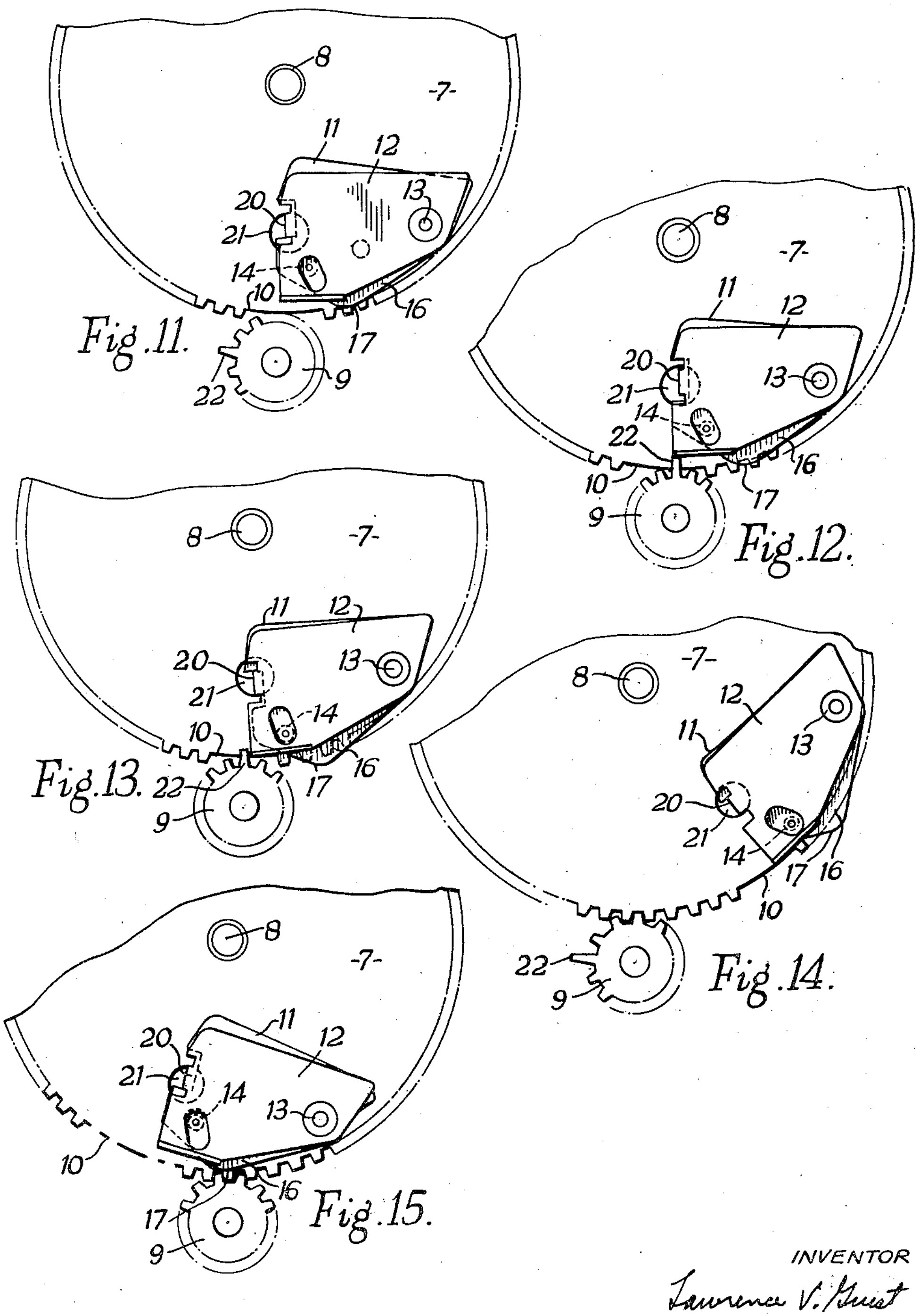

The edge of the plate 11 furthest from the axis of pin 8 is shaped to provide an extension 16 with a cam edge 17 and the length of the slot 15 is such that movement of the plate 11 is limited between a position as shown in FIGS. 11 and 15 in which the cam edge is wholly within the root circle of the teeth of gear wheel 7 and a position shown in FIG. 13 in which the part 16 of the plate 11 bounded by the cam edge 17 masks at least one space and in the case shown three adjacent spaces between teeth of the gear wheel 7 at one end of the gap 10 in the teeth i.e. that end which is trailing when the gear wheel 7 is rotating. A further edge of the plate 11 is notched as shown at 18 in FIG. 5.

The plate 12 constituting the above referred to second element rests upon the first plate 11 and it is formed on one edge with an upstanding flat lug 19 extending approximately tangential to the periphery of the gear wheel 7 and part way across the gap 10. The plate 12 is also formed on another edge with a downturned lug 20 which extends through the notch 18 on the first plate 11 and through a hole or slot 21 in the gear wheel 7 so that the extent of movement of the plate 12 about the pivot 13 is limited by engagement of the lug 20 with one end or the other of the slot 21 in the gear wheel 7 and the length of the notch 18 in the first plate 11 is such as to permit some further pivotal movement to the plate 11 before an end of the notch 18 meets the lug 20 already engaged with an end of the slot 21 in the gear wheel 7.

An eccentric member is provided on the underside of the turntable 2 in a position for intermittent engagement with the lug 19 on the second plate 12 with the said plate in a given position about its pivot on the gear wheel 7 whilst the latter is stationary, said eccentric member in the case illustrated being formed by a radial extension of the upper end of one of the teeth of the pinion 9 as shown at 22.

Figure 2:
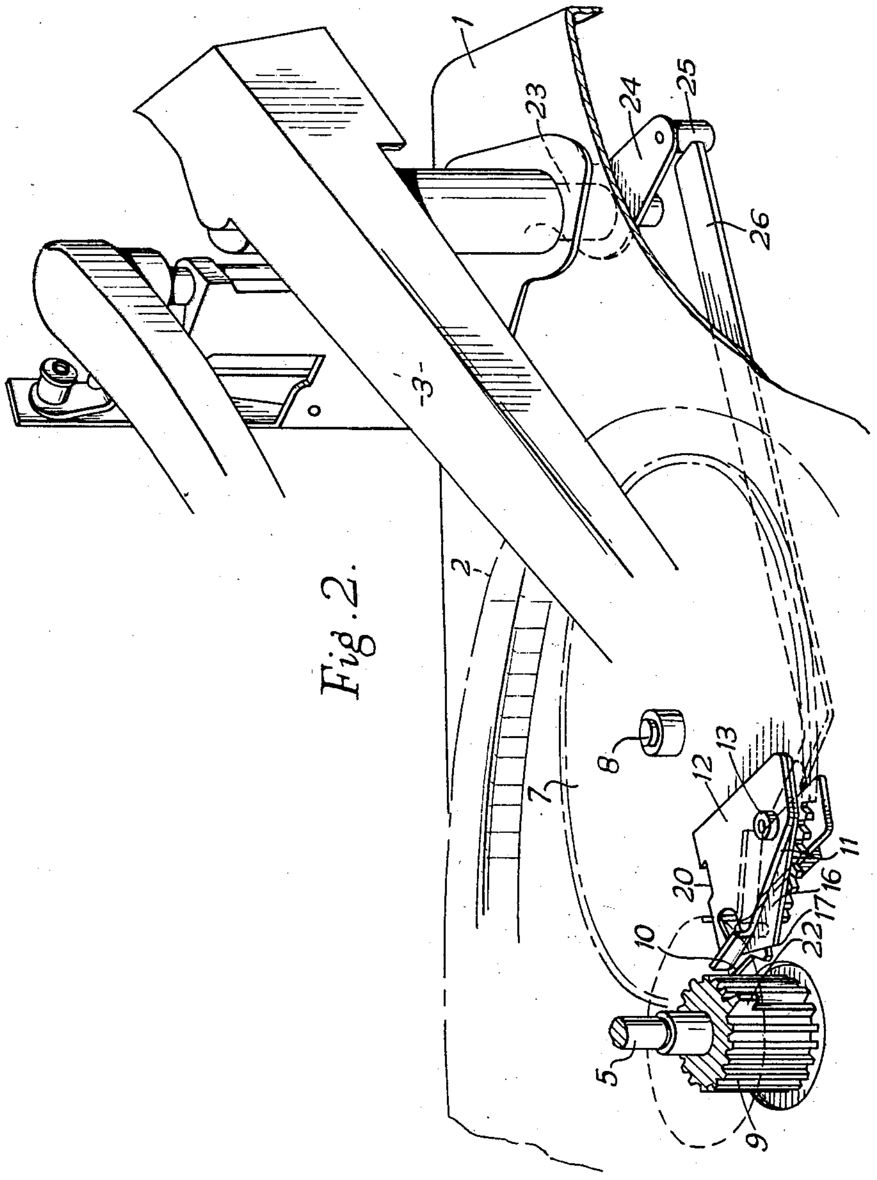
FIG. 2 is a view in perspective and on a larger scale showing parts of the control mechanism of the present invention located beneath the turntable (not shown)
Figure 3:
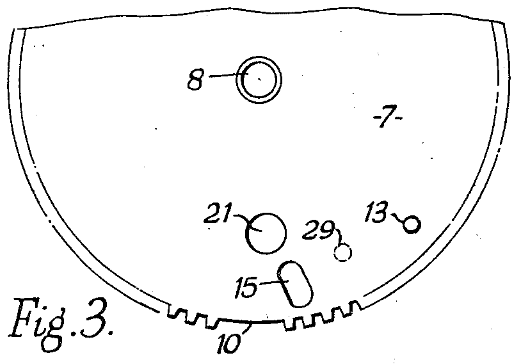
FIGS. 3 and 4 are views in plan and elevation respectively showing the first gear wheel.
Figure 4:
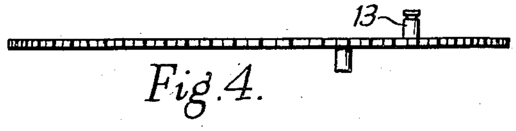

The pick-up arm 3 is carried at the upper end of a vertical spindle 23 rotatable in a bearing provided on the motor board to permit the necessary transverse swinging movement of the pick-up arm 3 and at the lower end of the spindle 23 is affixed an arm 24 (FIGS. 2 and 9) making swinging movement in conjunction with the pick-up arm 3.

The arm 24 carries a downwardly extending pin 25 arranged to make contact with the end of a transmission bar 26 when the pick-up arm 3 reaches a given point in its inward swing during playing of a record.

The transmission bar 26 is mounted for straight line movement beneath the motor boards its free end projecting upwards through a guide slot 27 in the motor board into position beneath the gear wheel 7.

The free end of the bar 26 carries an upwardly extending cam lug 28 of V-form in plan and in a position as shown in FIGS. 9 and 10 for engagement with the pin 14 depending from the first plate 11. On the underside of the gear wheel 7 is carried a downwardly extending pin 29 which is capable of engaging the exterior of the V-shaped cam lug 28 when the gear wheel 7 is rotated, in such a manner as to impart longitudinal re-setting movement to the bar 26.

The operation of the apparatus is as follows: With a record being played, the pinion wheel 9 is rotating with the turntable 2 and the gear wheel 7 is stationary with its gap 10 opposite the pinion 9 and the two plates 11 and 12 in the position wholly within the root circle of the teeth of the gear wheel 7 as shown in FIG. 11.

When the stylus of the pick-up 4 reaches to within a few turns of the end of the sound groove of the record being played the pin 25 on the arm 24 moving with the pick-up arm 3 comes into contact with the end of the transmission bar 26 (FIG. 9) and the latter is thereafter moved longitudinally at a slow constant speed whilst the stylus is traversing the last few turns of the sound groove.

As a result of this movement of the bar 26 the V-shaped cam lug 28 moves into contact with the pin 14 on the first plate 11 and the latter is caused to move about its pivot 13 towards the position in which the cam-edged extension 16 masks the spaces between some of the teeth at one side of the gap 10.

At the same time the second plate 12 moves with the first plate 11 about the pivot 13 by virtue of the frictional engagement between the two plates and as a consequence the upstanding lug 19 on the second plate 12 approaches the path of the eccentric element 22 on the pinion 9. Whilst the rate of approach of the lug 19 is dependent upon the rate of movement of the stylus in the sound record portion of the record groove, contact is made by the eccentric element 22 with the face of the cam lug 19 (see FIG. 12) once during each rotation of the turntable 2 and as a result of the wipe of the element 22 across the face of the cam lug 19 the plate is set back with reference to the first plate 11 as is permitted by the friction coupling between them.

This approach movement of the cam lug 19 on plate 12 with intermittent setting back continues until the stylus enters the run-out groove of increased pitch at the end of the record whereupon an accelerated and extended movement is imparted to the transmission bar 26 and such that the first plate 11 takes the position in which spaces between some teeth of the wheel 7 at one side of the gap 10 are fully masked by the cam-edged extension 16 as shown in FIG. 13 and the second plate 12 is moved to a position shown in that figure in which the eccentric element on pinion 9 meets the end of that cam lug 19.

In these conditions the depending lug 20 on the second plate 12 is against or close to one end of the slot 21 in the gear wheel 7 so that the thrust of the eccentric element 22 upon the end of the cam lug 19 has the effect of imparting a degree of rotation to the gear wheel 7 (in a counterclockwise direction in the drawings) sufficient to bring the leading teeth at one side of the gap 10 of the wheel 7 into meshing engagement with the teeth of the pinion 9 (see FIG. 14) so that the gear wheel 7 is rotated through one revolution to drive the automatic mechanism to execute a cycle of automatic operation.

Shortly prior to completion of the one revolution of the gear wheel 7 the pin 29 on the underside of the gear wheel 7 moves into contact with one side of the V-form cam lug 28 in the manner shown in full lines in FIG. 10 so that the cam lug and transmission bar 26 are moved longitudinally as indicated in dotted lines in FIG. 10, to a re-set position in preparation for the next succeeding automatic cycle, it being understood that the pick-up arm 3 and the lever 24 connected therewith have been moved to an outer position.

After re-setting engagement of the pin 29 with cam lug 28 the cam-edged extension 16 of the plate 11, still bridging the gaps between some of the trailing teeth of the wheel 7, come into engagement with the teeth of the pinion 9 so that the plate 11 is re-set to its position wholly within the root circle of the teeth of wheel 7 (see FIG. 15).

At the same time the plate 12 is also re-set to a position in which the flat lug 19 is away from the path of the eccentric 22 on pinion 9 either by virtue of its frictional engagement with the plate 11 or positively by contact of one end of the notch 18 in plate 11 with the depending lug 20 on plate 12. Thus the two plates 11 and 12 are re-set with reference to the wheel 7 in readiness for the next succeeding automatic cycle.

Rotation of the wheel 7 by the pinion 9 continues until the gap reaches the position opposite the pinion 9 whereupon the wheel 7 comes to rest.

When the extension 16 of the first plate 11 is capable of bridging a number of adjacent spaces between teeth of the gear wheel 7 as in the case shown, it is preferable that the overlap of adjacent spaces be of progressively increasing extent in the direction towards the gap 10 so that a slow cam 17 produces a gentle and progressive re-setting of the two elements 11 and 12 on the wheel 7 under the thrust of the teeth of the pinion 9.

Whilst in the example illustrated and described above the first element 11 is moved across spaces between teeth of the first gear wheel 7 and is moved for re-setting by engagement of a part thereof by the teeth of the pinion 9, it will be understood that the re-setting may be effected by other means such as a cam carried for rotation with the driving pinion or turntable in such manner as to engage and move the first element 11 at an appropriate point in the rotation of the gear wheel 7 and relative to the gear wheel 7.

I claim:

1. In a sound reproducing apparatus for effecting automatically a succession of reproductions from disc records and including a mechanism clutched to a continuously rotating part of the machine upon completion of one sound reproduction for the purpose of executing a cycle of automatic operations as a preliminary to a succeeding sound reproduction, the combination of a first gear wheel having a gap in its teeth, a continuously driven second gear wheel having teeth for meshing engagement with those of the said first gear wheel and positioned opposite said gap when said first gear wheel is in its normal position, a lower flat plate mounted on said first gear wheel for movement between a re-set position and a position toward said second gear wheel, means positively limiting the extent of movement permitted to said lower flat plate in opposite directions relative to said first gear wheel, an upper flat plate mounted on said first gear wheel freely for movement between a re-set position away from said second gear wheel and a position towards said second gear wheel, said upper flat plate being superimposed upon said lower flat plate and carried by frictional surface contact therewith whereby movement of said upper flat plate relative to said lower flat plate between said positions is restricted solely by friction developed by the weight of said upper plate over the surface contacting said lower plate, means positively limiting the extent of movement permitted to said upper flat plate in opposite directions relative to said lower flat plate, means including a control member movable in accordance with movement of the pick-up arm of the reproducing apparatus for engaging said lower flat plate and moving said lower flat plate and said upper flat plate resting thereon in unison in a first direction relative to said first gear wheel toward said second gear wheel, an engaging member on the continuously driven second gear wheel making intermittent engagement with the said upper flat plate and operating to move said upper flat plate with respect to the said lower flat plate intermittently in the direction opposite to said first direction during the normal rate of movement of the pick-up arm, and an abutment on said upper flat plate engaged by the engaging member on the continuously driven second gear wheel upon a movement of the said control member at a speed in excess of the normal speed and operating to move the said upper flat plate, said lower flat plate and the said first gear wheel in unison about the axis of the said first gear wheel to engage the teeth of the said first gear wheel with the teeth of said continuously driven second gear wheel.

2. Sound reproducing apparatus as claimed in claim 1 wherein the said lower flat plate and said upper flat plate superimposed thereon are mounted for movement about a common fixed pivot on said first gear wheel and primary stop means are provided to limit movement of both said lower flat plate and said upper flat plate in both directions about said common fixed pivot and secondary stop means are provided to limit movement of said upper flat plate in both directions about said common fixed pivot and relative to said lower flat plate.

3. Sound reproducing apparatus as recited in claim 1 in which said lower flat plate has a part located near the end of the gear teeth of said first gear wheel, said part being movable by said control member to the position toward said second gear wheel in which it projects into the path of teeth of said second gear wheel when said first and second gear wheels are in driving connection, and being movable to said re-set position out of said path by engagement therewith of the teeth of said second gear wheel when said first and second gear wheels are in driving connection.

4. Sound reproducing apparatus as recited in claim 3 in which said part of said lower flat plate is a shaped edge capable in one position of said lower flat plate of bridging a number of adjacent spaces between the teeth of said first gear wheel at the side of the gap therein which is trailing when said first gear wheel is being driven by said second gear wheel, said bridging being of progressively increasing radial extent in the direction from said gap so that a progressive and gentle re-setting of said flat plates is effected when said part is engaged by the teeth of said second gear wheel.

5. Sound reproducing apparatus as recited in claim 1 in which said control member is a sliding bar which is engaged and driven by and separable from a part fixed to the pick-up arm and which is frictionally held in an operative position, and including cam means operated by said first gear wheel near the end of a complete revolution thereof for returning said central member to a re-set position.

References Cited in the file of this patent

UNITED STATES PATENTS

| | | |
|---|---|---|
| 2,457,106 | Pressley | Dec. 21, 1948 |
| 2,544,230 | Johnson | Mar. 6, 1951 |
| 2,616,703 | Leonard | Nov. 4, 1952 |
| 2,795,429 | Vistain | June 11, 1957 |
| 2,803,465 | Dobrogowski | Aug. 20, 1957 |
| 2,898,114 | Vistain | Jan. 13, 1959 |